(12) United States Patent
Gao et al.

(10) Patent No.: US 9,237,449 B2
(45) Date of Patent: Jan. 12, 2016

(54) AUTOCORRELATION-BASED SPECTRUM SENSING FOR FM SIGNALS

(75) Inventors: Wen Gao, West Windsor, NJ (US); Hou-Shin Chen, East Brunswick, NJ (US)

(73) Assignee: THOMSON LICENSING, Issy les Moulineaux (FR)

(*) Notice: Subject to any disclaimer, the term of this patent is extended or adjusted under 35 U.S.C. 154(b) by 106 days.

(21) Appl. No.: 13/514,584

(22) PCT Filed: Dec. 21, 2009

(86) PCT No.: PCT/US2009/006684
§ 371 (c)(1),
(2), (4) Date: Jun. 7, 2012

(87) PCT Pub. No.: WO2011/078836
PCT Pub. Date: Jun. 30, 2011

(65) Prior Publication Data
US 2012/0238227 A1    Sep. 20, 2012

(51) Int. Cl.
*H04B 1/18*     (2006.01)
*H04W 16/10*    (2009.01)
*H04L 27/10*    (2006.01)
*G06F 3/033*    (2013.01)
*H04B 1/16*     (2006.01)

(52) U.S. Cl.
CPC ............. *H04W 16/10* (2013.01); *H04L 27/10* (2013.01)

(58) Field of Classification Search
CPC .......................... H04B 1/71637; G10L 19/005
USPC ........................................................ 375/150
See application file for complete search history.

(56) References Cited

U.S. PATENT DOCUMENTS

| 6,625,201 | B1* | 9/2003 | Stirling-Gallacher | ........ 375/144 |
| 7,528,751 | B2 | 5/2009 | Park et al. | |
| 2005/0089083 | A1* | 4/2005 | Fisher et al. | ................ 375/130 |
| 2006/0007990 | A1* | 1/2006 | Cozzo et al. | ................ 375/148 |
| 2006/0114812 | A1* | 6/2006 | Kim et al. | .................... 370/206 |
| 2006/0152276 | A1 | 7/2006 | Barksdale | |
| 2006/0293007 | A1 | 12/2006 | Kim | |

(Continued)

FOREIGN PATENT DOCUMENTS

| CN | 101123477 | 2/2008 |
| WO | WO2008153553 | 12/2008 |

OTHER PUBLICATIONS

Chen et al., "Spectrum Sensing for Wireless Microphone Signals," In IEEE SECON 2008, Jun. 2008, retrieved from the Internet on Feb. 4, 2010, 6 pages.

(Continued)

*Primary Examiner* — Ayodeji Ayotunde
(74) *Attorney, Agent, or Firm* — Robert D. Shedd; Jerome G. Schaefer (57) ABSTRACT

A method and system for detection of available a white space channel in an area of licensed transmitters includes a detector which utilizes the autocorrelation analysis of a channel in an frequency modulated (FM) band. Calculation of the autocorrelation excludes an initial set of correlation delay values such that large values of autocorrelation are removed. The remaining autocorrelation based on higher correlation delay values exposes the sinusoidal nature of an FM transmitter operating in the selected channel. White space becomes available to a user if no transmitter is detected using the autocorrelation detection method.

15 Claims, 9 Drawing Sheets

(56) References Cited

U.S. PATENT DOCUMENTS

| | | | |
|---|---|---|---|
| 2007/0092045 A1 | 4/2007 | Woo et al. | |
| 2008/0024336 A1* | 1/2008 | Park | H04B 17/382 341/110 |
| 2008/0089401 A1* | 4/2008 | Lai et al. | 375/226 |
| 2008/0298223 A1* | 12/2008 | Chang et al. | 370/203 |
| 2010/0159858 A1* | 6/2010 | Dent et al. | 455/131 |
| 2011/0045781 A1* | 2/2011 | Shellhammer et al. | 455/67.11 |
| 2011/0103430 A1* | 5/2011 | Witrisal | 375/142 |

OTHER PUBLICATIONS

Clanton et al, "Wireless Microphone Signal Simulation Method," IEEE P802.22 Wireless RANs, Mar. 2007, pp. 1-7.

FCC, "Evaluation of the Performance of Prototype TV-Band White Space Devices Phase II," OET Report 08-TR-1005, Oct. 2008, 149 pages.

FCC, "Second Report and Order and Memorandum Opinion and Order," FCC 08-260, Nov. 2008, pp. 1-130.

* cited by examiner

AUTOCORRELATION-BASED SPECTRUM SENSING FOR FM SIGNALS

FIELD

The present invention relates to communications, and in particular, to the detection of available channels within licensed white-space frequency bands.

BACKGROUND

Recently, the Federal Communications Commission (FCC) has approved the operation of unlicensed radio transmitters in the broadcast television spectrum at locations where that spectrum is not being used by licensed services under certain restrictions. Some restrictions are specified in a publication by the FCC, entitled "Second Report and Order and Memorandum Opinion and Order," ET Docket No. 08-260, November 2008. The unused spectrum available for unlicensed use, which may include television and other pre-allocated spectrum, is often termed "white space". One major restriction on spectrum use is that unlicensed devices which can operate in the white space will be required to sense, at levels as low as −114 dBm, licensed transmitter signals, such as licensed digital and analog television transmitter signals, licensed wireless microphone signals, and signals of other services that operate in the multiple use bands on intermittent basis. In one example, a licensed sports television network may have authority to operate in the area of a sports arena, such as a football stadium. Such licensed use can include the use of wireless microphone transmitters to accommodate coverage of the sports event. However, such use is intermittent because the football event may only occur for a limited number of hours of an event day. Thus, the spectrum normally available only to the licensed wireless transmitters can be made available for un-licensed use under the new FCC guidelines.

Some prior art devices which detect white space frequency band availability operate on the principle of spectrum peak detection of licensed transmissions. However, such spectrum peak detectors will fail to properly identify an available channel when strong adjacent channel interference exists. Strong licensed signals, such as a digital television (DTV) signal can introduce adjacent channel interference due to leakage into adjacent spectrum which can cause false positive results in white space detectors that operate using spectrum peak-based detection. This false detection can eliminate an otherwise available channel from being utilized by the white space detector.

SUMMARY

The present invention is directed to methods and apparatus that detect signal transmissions of devices using frequency modulation (FM) using an autocorrelation-based spectrum sensing algorithm. Examples of FM transmissions include signal transmissions from entities authorized to use a television (TV) band. Examples of devices using FM transmission are wireless microphones or other devices producing FM signals. In one embodiment, the inventive method includes a detection of a transmitter based on the property that the autocorrelation function of an FM signal is approximately a sinusoidal function. Calculation of the autocorrelation excludes an initial set of correlation delay values such that large values of autocorrelation are removed. The remaining autocorrelation based on higher correlation delay values exposes the sinusoidal nature of an FM signal transmitting in the selected channel under consideration. White space may become available to a user if no signals having sinusoidal properties representative of an FM transmitter are detected in the TV band of interest.

In one aspect of the invention, a method is performed by a device to detect available white space band for use by non-licensed devices that wish to operate in the licensed band that is not being used by a licensed operator. The detection method includes first obtaining a digital sample set of the selected frequency band. Then, an autocorrelation is calculated using the digital sample set. The autocorrelation function is calculated by excluding a set of initial correlation delay values. This effectively eliminates large value auto correlation elements which are the result of adjacent channel interference in the band of interest. The detection method then calculates a decision statistic and determines, using the decision statistic, if an FM signal is operating in the selected frequency band. If the bandwidth is available, the user may transmit in the selected band.

In another aspect of the invention, a device to detect frequency modulated transmission in a selected frequency band includes an analog to digital converter to produce a digital sample of the selected band. A processor of the detection device calculates an autocorrelation function using the digital sample such that the autocorrelation function is calculated by excluding a set of initial correlation delay values. The processor then calculates a decision statistic using the autocorrelation function and determines if an FM signal is present in the selected frequency band based on the decision statistic.

The method and device thus described may be integrated into a single handheld device that can detect for FM transmission in multiple channels, either by manual selection or by automated process, to determine the availability of white space band available for a user transmission.

Additional features and advantages of the invention will be made apparent from the following detailed description of illustrative embodiments which proceeds with reference to the accompanying figures.

DETAILED DISCUSSION OF THE EMBODIMENTS

In the discussion that follows, a wireless microphone using FM type modulation is used as an example of a FM transmitter device. One of skill in the art will recognize that any type of FM transmission equipment may be used as the transmitter; the wireless microphone is merely a convenient example to illustrate the principles of the present invention. Examples of transmitters include wireless microphones, repeaters, two way radios, remote controls, and other possible frequency modulation-based transmitting equipment.

Frequency Modulation (FM) is an analog modulation method. The frequency of the sinusoidal carrier wave is varied in accordance with the baseband signal. The FM signal $$s(t) = A_c \cos\left[2\pi f_c t + 2\pi \Delta f \int_0^t m(u)du\right] \quad (1)$$

where m(t) is the transmitted signal and |m(t)|≤1. Note that many practical applications of FM technique are to convey voice signal. Thus, the transmitted signal m(t) can be a voice signal which has a bandwidth less than 20 kHz. The parameters $A_c$ and $f_c$ are carrier amplitude and carrier frequency, respectively. The constant Δf is the frequency deviation of the FM modulator, representing the maximum departure of the instantaneous frequency of the FM signal from the carrier frequency $f_c$.

In addition, it can be shown that the autocorrelation function of the FM signal, s(t) is given by equation (2) as:

$$R_s(\tau) \equiv E[s(t)s(t-\tau)] = \frac{A_c^2}{2} E\left[\cos\left(2\pi f_c \tau + 2\pi \Delta f \int_{t-\tau}^t m(u)du\right)\right]. \quad (2)$$

The integral term inside the cosine function has a maximum value 2πΔfτ. In an article by C. Clanton, M. Kenkel and Y. Tang, entitled "Wireless Microphone Signal Simulation Method," *IEEE* 802.22-07/0124r0, March 2007, the maximum frequency deviation suggested is equal to 32.6 kHz. The carrier frequency $f_c$ is in the order of MHz. Therefore, when the correlation delay is small, the contribution of the integral term inside cosine function can be ignored and the autocorrelation may be express as equation (3) as:

$$R_s(\tau) \cong \frac{A_c^2}{2} \cos(2\pi f_c \tau). \quad (3)$$

The autocorrelation of an FM signal exhibits sinusoidal properties.

Assume that an FM signal, such as a licensed wireless microphone transmission signal, is captured by a receiver and down-converted to an intermediate frequency (IF), then, the received analog signal y(t) is sampled at a sampling frequency of $f_s$ by an analog-to-digital converter (ADC), i.e., y[n]=y(n/$f_s$). The autocorrelation function is computed by equation (4) as:

$$R_y[m] = \sum_n y[n] \cdot y[n-m]. \quad (4)$$

where m is the autocorrelation delay, which is also known simply as the correlation delay.

Figure 1:
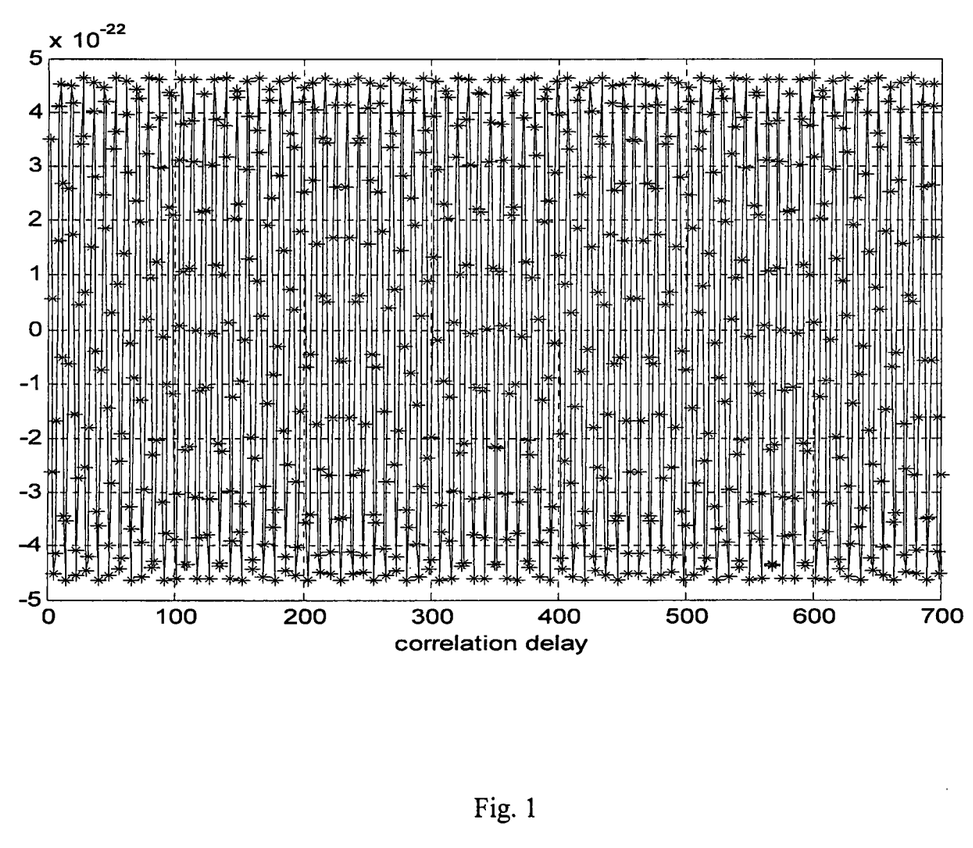
FIG. 1 illustrates a first autocorrelation function of an FM signal.

FIG. 1 is illustrates a plot of an autocorrelation function of a pure FM signal. Note the nearly constant peak amplitudes of the autocorrelation plot over many correlation delay values.

Figure 2:
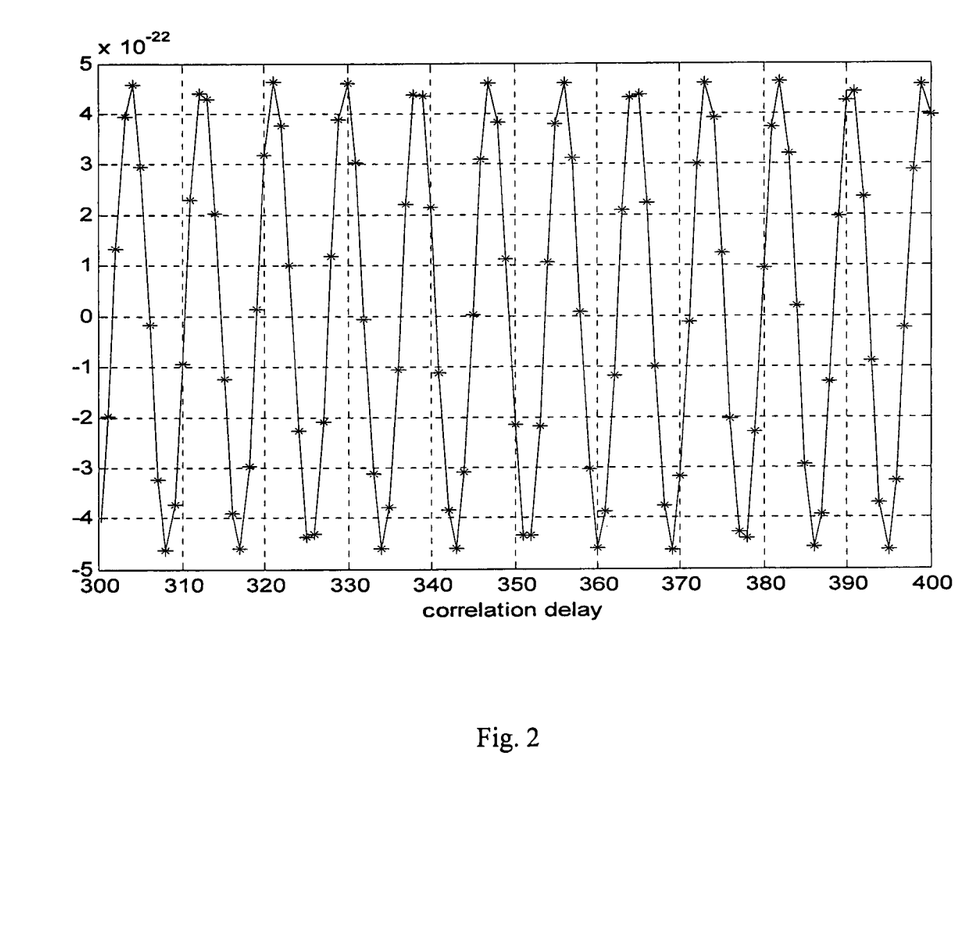
FIG. 2 illustrates a second autocorrelation function of an FM signal.

FIG. 1 illustrates that the autocorrelation function of an FM signal operating in a particular frequency band exhibits large peak values over a large range of correlation delay values. In FIG. 1 and FIG. 2, the autocorrelation function is computed using 10 milliseconds of signal. The carrier frequency and sampling frequency are 2.48 MHz and 21.52 MHz, respectively. Thus, the largest correlation delay in FIG. 1 is 700/21520000=32.5 micro-seconds. FIG. 2, which is an expanded view of a portion of FIG. 1, clearly indicates that the autocorrelation function of the FM signal is a sinusoidal function.

Figure 3:
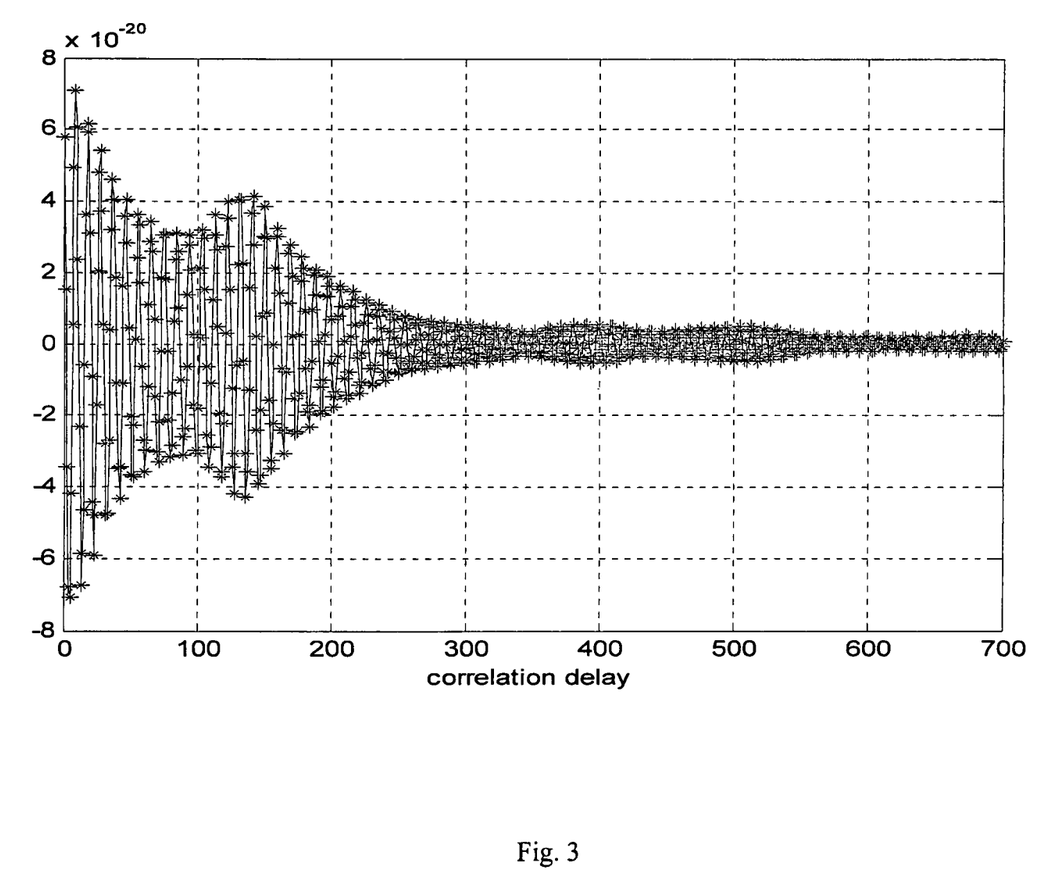
FIG. 3 illustrates an autocorrelation function of a received signal which includes interference and additive white Gaussian noise.

FIG. 3 shows an example of the autocorrelation function of a signal which includes of an FM signal, channel interference from lower adjacent channel, such as from an active TV channel transmission leaking into an adjacent band, and additive white Gaussian noise (AWGN). In FIG. 3, the autocorrelation function is large for roughly the first 300 correlation delays and the sinusoidal property of an FM signal can be masked by the large peak magnitudes of the value of the autocorrelation function due to the interference caused by an adjacent channel interference signal. Assume that the received signal consists of an FM signal, adjacent channel interference, and additive white Gaussian noise. The received signal can be represented as equation (5) as:

$$y[n]=s[n]+i[n]+w[n] \quad (5)$$

where i[n] and w[n] are adjacent channel interference and noise, respectively. Since these three signals are mutually independent, the autocorrelation function of the received signal y[n] is represented by equation (6) as:

$$R_y[m]=R_s[m]+R_i[m]+R_w[m]. \quad (6)$$

In one aspect of the invention, because $R_i[m]+R_w[m]$ is large in the beginning and becomes small when the correlation delay m increases, by discarding those $R_y[m]$'s with large values due to interference and noise and by only computing the $R_y[m]$'s which reveal the sinusoidal property of the FM signal, a detection method may be realized. Assume that $R_y[m]$ starts to reveal the sinusoidal property of the FM signal for m≥L. Note that L depends on the adjacent channel interference and it is determined by a heuristic method. One method of determining L is to assume a worst case interference for a band and determine L accordingly. In one aspect of the invention, the autocorrelation function of equation (6) is calculated by excluding a set of initial correlation delay values. This initial set of correlation delay values generally results in large values of autocorrelation which can mask the sinusoidal nature of the FM signal.

For example, from FIG. 3, we can select L=300. Then, only $R_y[m]$'s for L≤m≤L+M−1 are computed. Thus, the set of initial values of correlation delay from m=0 to m=300 are excluded from the autocorrelation calculation of equation (6). The parameter M will depend on how long the correlation delay can be applied such that the sinusoidal property in (3) is maintained. Using the present invention, it has been experienced that M can be as large as a thousand. However, larger M results in larger complexity. Thus, optimally, a selection of M can be made as small as possible to insure the required sensitivity is achieved.

The autocorrelation function of an FM signal is provided in equation (7) as:

$$R_s[m] = \frac{A_c^2}{2} \cos(2\pi f_c m / f_s). \quad (7)$$

If the carrier frequency of the FM signal is known, the optimal detector is a matched filter. That is, the decision statistic of the optimal detector is given by equation (8) as:

$$T = \sum_{m=L}^{L+M-1} R_y[m] \cdot \cos(2\pi f_c m / f_s) \quad (8)$$

This decision statistic essentially behaves like a matched filter and equation (8) can be used to detect a known FM signal.

The decision statistic for an FM signal with known carrier frequency given in equation (8). However, a licensed wireless microphone device can select any frequency within an available channel, such as a TV channel, as long as the frequency offsets from the channel edge is a multiple of 25 kHz. Assume that the received signal occupies a band from P MHz to (P+B) MHz, where B=6 in USA or B=8 in Europe. The wireless microphone devices can select $f_0$=P MHz+50 kHz, $f_1$=P MHz+75 kHz, . . . , $f_{N-1}$=(P+B) MHz−50 kHz, as its carrier frequency. There are totally N=1+(B MHz−100 kHz)/(25 kHz) possible carrier frequencies. As a result, the decision statistic of the optimal detector is given by equation (9) as:

$$T = \max_{0 \leq n \leq N-1} \sum_{m=L}^{L+M-1} R_y[m] \cdot \cos(2\pi f_n m / f_s). \quad (9)$$

The decision statistic algorithm for an FM signal, such as a wireless microphone transmitter, with an unknown carrier frequency is given in equation (9). Note that the bandwidth of an example wireless microphone signal is less than 200 kHz. In another embodiment of the present invention, the spectrum sensing performance can be improved by using a 200 kHz narrow band-pass filter to capture a signal of 200 kHz centered at all possible carrier frequencies and then compute the autocorrelation function and determine the decision statistic given in equation (9). This narrow band-pass filtering operation will significantly reduce the interference power and noise power. However, the complexity of a narrow band-pass filtering operation is large. In addition, a tunable narrow band-pass filter may be required and the filtering operation needs to be performed for N times. Thus, although the narrow band-pass filtering approach provides some performance gain, the additional complexity may be too large for some applications. This approach is tractable when the carrier frequency is known.

In one aspect of the invention, a method performed by an apparatus can be realized that allows reliable detection of a FM transmission in a potential white space channel. The present inventive detection is enhanced over prior art methods by applying the herein described auto correlation algorithm in the presence of noise and inter-channel interference which could cause false positive detections of licensed FM transmissions.

Figure 4A:
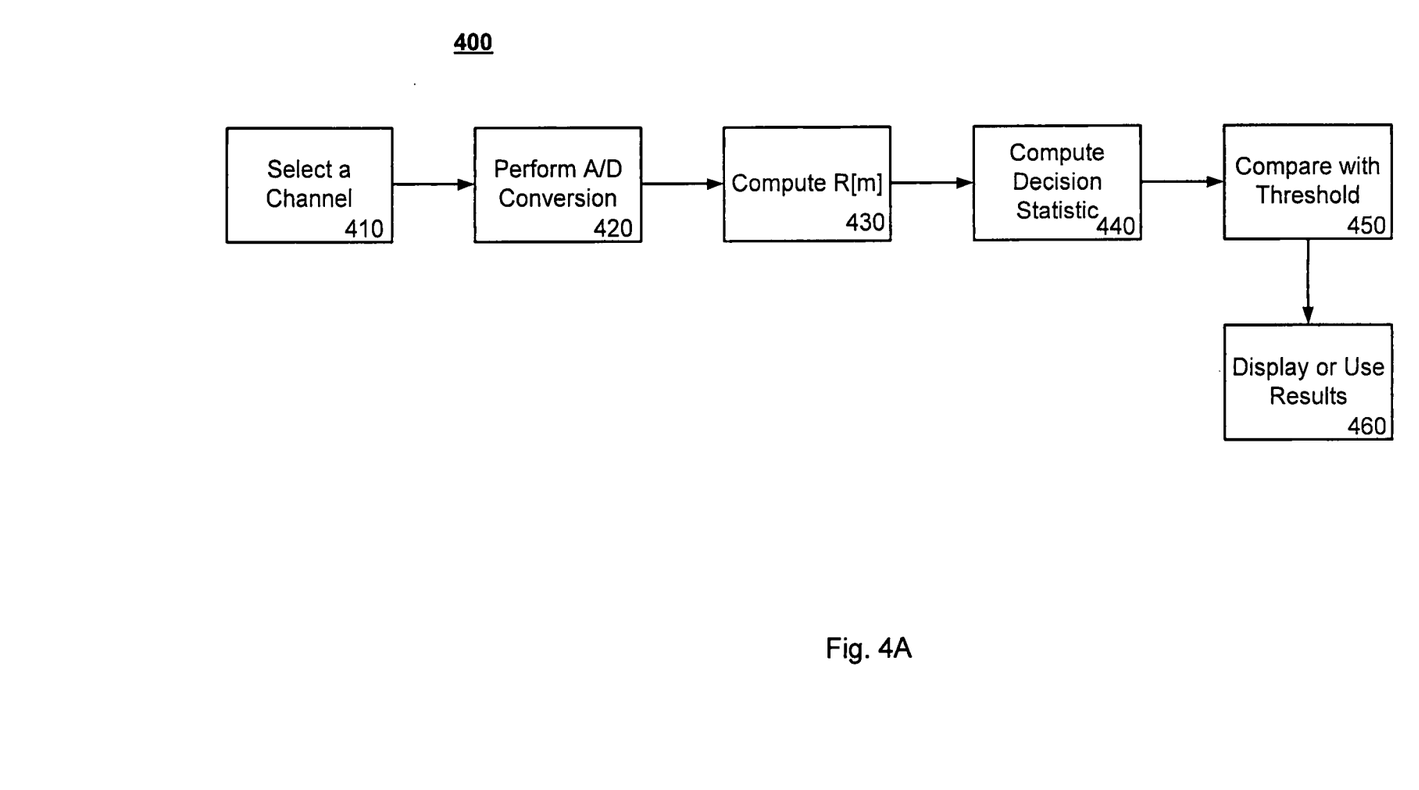
FIG. 4A illustrates one embodiment of an autocorrelation detection method according to aspects of the invention.

FIG. 4A depicts a method 400 of white space detection availability using autocorrelation according to the present invention. Initially, a channel is selected at step 410. The channel may be automatically selected or the channel may be selected via an user input such as via a graphical user interface. An analog to digital (A/D) conversion is performed on the selected channel band in step 420 to sample the in-band signal and convert the samples to digital format for digital processing. At step 430, an autocorrelation is performed using the sampled data. Such an autocorrelation is calculated using equations (4) and (6) above. According to an aspect of the invention, autocorrelations involving small values of correlation delay are excluded from the autocorrelation computation of equation (6) so as to eliminate the effect of adjacent channel interference occurring in the band of interest. The autocorrelation is thus calculated using an abbreviated range of correlation values. For example, the range of correlation values shown in FIG. 3 from 0 to 300 may be excluded from the calculation of the auto correlation at step 430 to eliminate the effect of adjacent channel interference that are exhibited with correlation values 0 to 300. Thus, in this example, only values 301 to 700 need be calculated. The results of these calculations may be stored for later use. A decision statistic is then calculated at step 440 according to either equation (8) if the carrier frequency of the FM signal is known, or according to equation (9) if the frequency of the FM signal is unknown. The decision statistic is then compared with a threshold at step 450 to determine if an FM transmitter is operating in the selected channel upon which an autocorrelation according to the present invention was made. The threshold may be selected to trade off a false alarm rate versus a detection probability. The results of the threshold applied to the decision statistic are then provided at step 460. Such results can either be used by subsequent operations or may be displayed to a user.

Figure 4B:
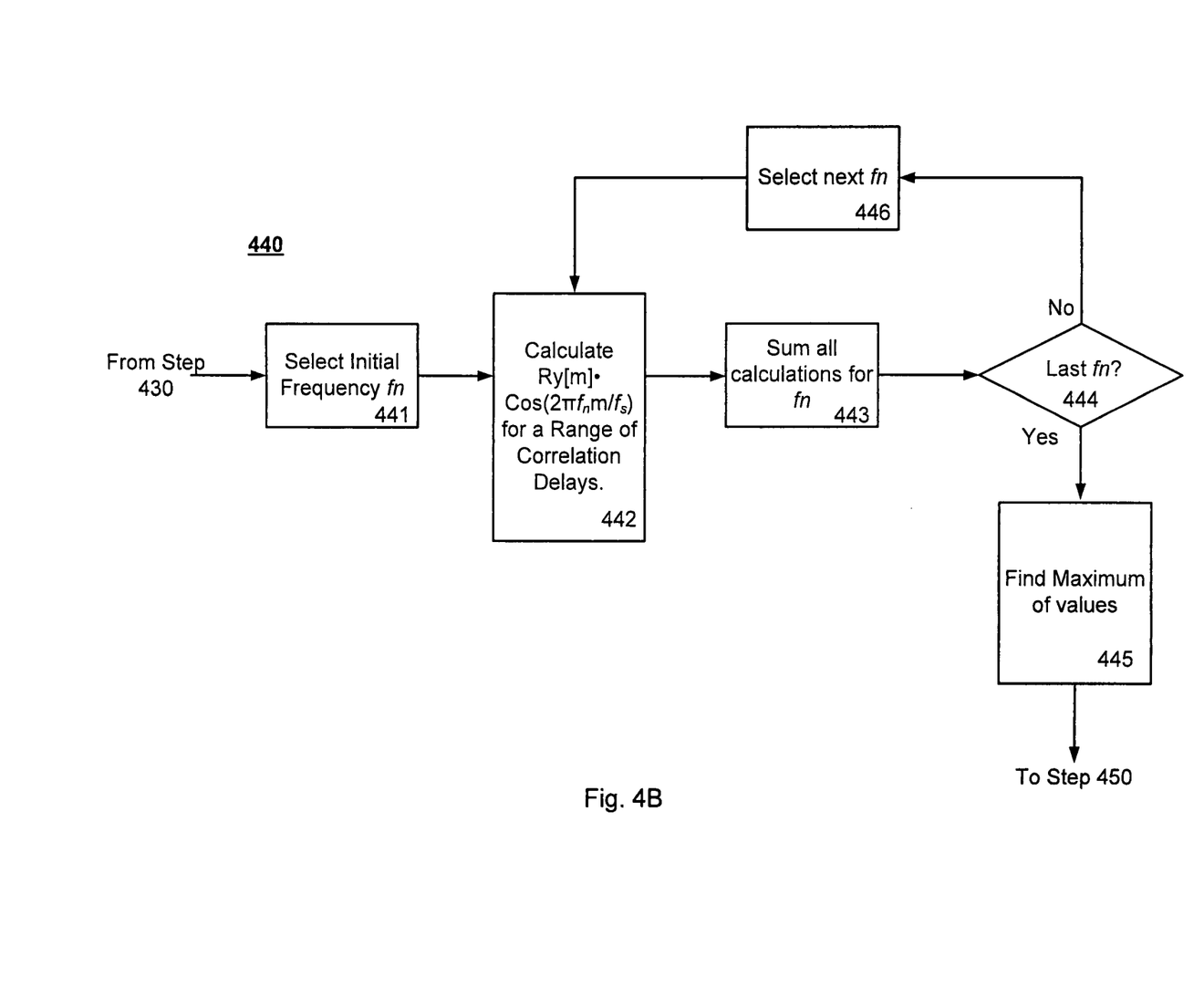
FIG. 4B illustrates on embodiment of a method to compute a decision statistic according to aspects of the invention.

If the carrier frequency of the FM signal to be detected in the band of interest is unknown, then likely carrier frequencies within the band should be tested by the decision statistic. FIG. 4B depicts an example flow diagram of a step 440 to determine the decision statistic of equation (9) using the autocorrelations computed in step 430. Equation (9) is utilized if the carrier frequency of the FM signal is unknown. The frequency band of interest may have many possible FM channels. Each likely carrier frequency in the band is tested in the decision statistic of equation (9) before being compared against a threshold at step 450.

In FIG. 4B, a first value of fn, such as $f_0$, is selected at step 441 representing an initial carrier frequency for an FM signal in the band of interest. At step 442, the term $R_y[m] \cdot \cos(2\pi f_n m/f_s)$ is calculated for the specific value of $f_n$ selected over all selected values of correlation delay. At step 443, the values calculated using a specific $f_n$ for the range of correlation delays are summed together. A decision statistic $T_n$ is thus formed for the value of $f_n$ selected over the set of correlation delays. For example, for n=0, the initial carrier frequency of $f_0$, over all selected values of correlation delay, the sum is represented by $T_0$. This calculated value of statistic $T_0$ for a specific carrier frequency is saved. At step 444, it is determined if the value of $f_n$ is the last value of carrier frequency in the band of interest. If $f_n$ is not the last value, then step 446 selects the next value of carrier frequency ($f_{n+1}$) and a next value for the next $T_{n+1}$ is calculated at step 443. The loop continues until each of the separately calculated statistic $T_n$ of all likely values of carrier frequency are calculated. Finally, if the current value of carrier frequency ($f_n$) is the last likely carrier frequency in the band of interest, then step 445 determines the maximum value T of the multiple values of the individual decision statistics ($T_n$). It is this maximum value T that represents the largest autocorrelation value for any of the FM carrier frequencies in the band of interest. Thus, a final decision statistic of equation (9) represents a maximum value (T) of the statistics calculated using multiple carrier frequency values in the selected frequency band. That is, T=max of {$T_0, T_1, T_2, \ldots T_{N-1}$}. This final value of T from equation (9) is sent to step 450 of FIG. 4A. As above, this value is compared against a threshold to determine if an FM signal is present in the band of interest.

Figure 5:
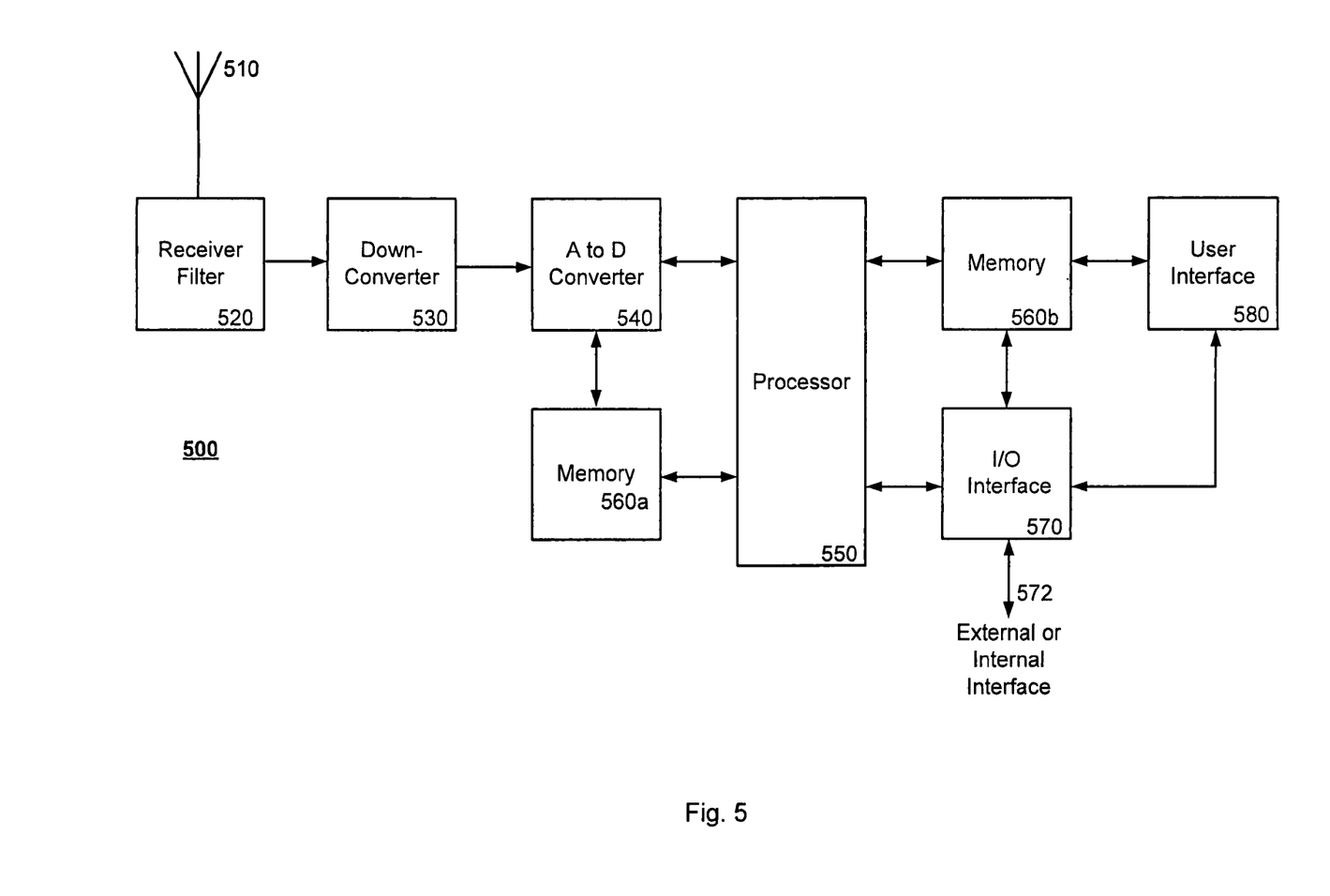
FIG. 5 illustrates one embodiment of a block diagram of a white space detector according to aspects of the invention.

FIG. 5 depicts a block diagram 500 of a white space detector according to aspects of the invention. Antenna 510 feeds received FM signals into a receiver filer 520 to limit the bandwidth of the received spectrum. In one embodiment, the received bandwidth corresponds to a channel used for transmission from FM devices. For example, the received signal may originate from a wireless microphone transmitter operating using an FM modulation. In one example embodiment, a TV channel (e.g. 6 MHz in North America, 8 MHz in Europe) is captured by the chain of an RF antenna 510, a receiver filter 520, and down-converter 530. The down-converter 530 downconverts the received and filtered TV channel signal to a baseband signal using a proper Intermediate Frequency (IF). An analog to digital converter (ADC) 540 is used to sample the down-converted TV channel signal. In an alternate embodiment, the ADC can be used in a digital down-conversion process as is well known by those of skill in the art and the separate down-converter 530 may be unnecessary.

Processor 550 includes the necessary interfaces to communicate with the ADC 540, memory 560, and input and output (I/O) block 570. The processor 550 inputs the digital samples of the ADC and calculates an autocorrelation according to aspects of the invention. The processor 550 utilizes memory 560a and 560b to store and recall both program and data. Memory 560a and 560b may be the same or differently organized memory. In one embodiment, samples from the ADC 540 can be placed directly into memory 560a for access by the processor 550. The samples can be processed by the processor 550 using the techniques and algorithms described above and the results can be stored in memory 560b for use by the user interface 580, which may include a display and keypad, or by the I/O interface block 570.

In one aspect of the embodiment of FIG. 5, the user interface may be used to enable the user to select a frequency band to analyze for transmissions. The user interface 580 may also be used to display the results of processing by the detector device 500. In one embodiment, the I/O interface block 570 can enable an external interface 572, such as a USB or other serial or parallel connection to allow the results of the analysis of device 500 to be sent to an external device. In one embodiment, the interface 572 can be any of a variety of wireless interfaces, such as RF, infrared, Bluetooth, or other wireless standard. Alternately, the I/O block 570 can implement an internal bus connection interface 572 to allow further processing or use of the results of the device 500 processing. For example, if available white space is detected by device 500, the interface from I/O block 570 can enable a device to transmit on the available frequency band for the user.

Figure 6:
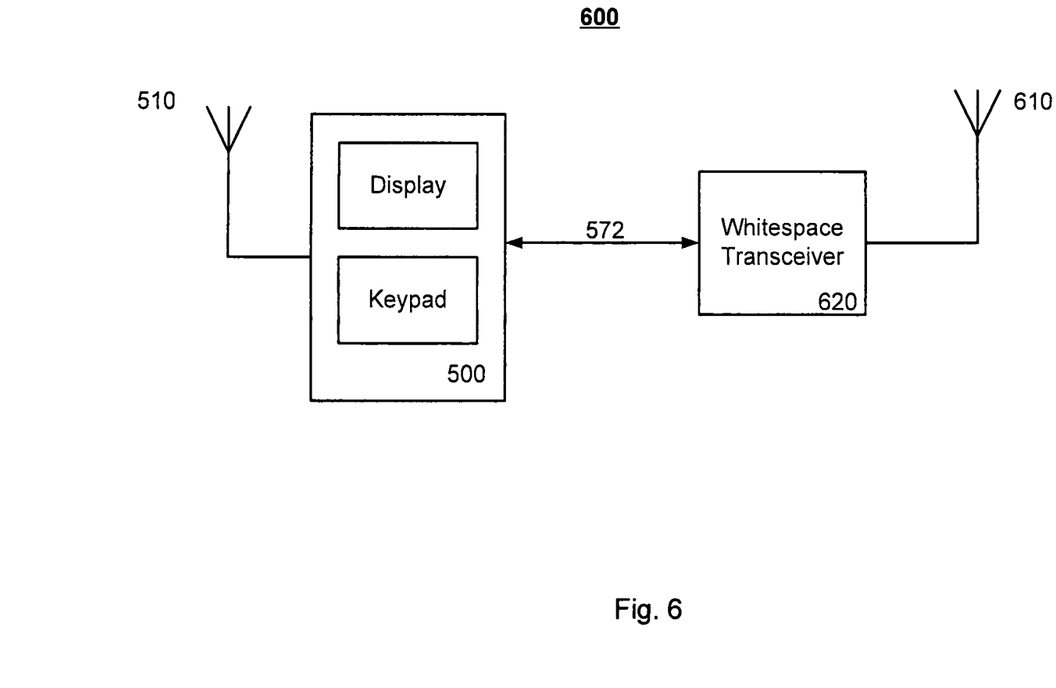
FIG. 6 illustrates one embodiment of a white space detector according to aspects of the invention.

FIG. 6 is an example system 600 of the detector 500 having interface 572 to enable white space transmitter, or combined transmitter and receiver (transceiver) 620 to transmit or receive on antenna 610 after detection of available band. In one embodiment, the system 600 can be a handheld device 500 connecting to an external white space transceiver 620. In a alternate embodiment, the system 600 can be an integrated white space detector, such as a handheld wireless device, that integrates the present invention into a device that searches, either automatically, or manually, for available white space band and then utilizes the band depending on its availability. According to the embodiment, antennas 510 and 610 can be the same or different devices.

For example, the system 600 can be implemented as a dual mode cell phone, where the non-cellular mode is made available as a result of the availability of white space depending on the autocorrelation detection technique of the present invention. Alternately, the FIG. 6 system 600 may depict any type of personal digital assistant (PDA), scheduler, e-mail device, or ad-hoc voice or data link device that can utilize available wireless white space frequency band.

Figure 7:
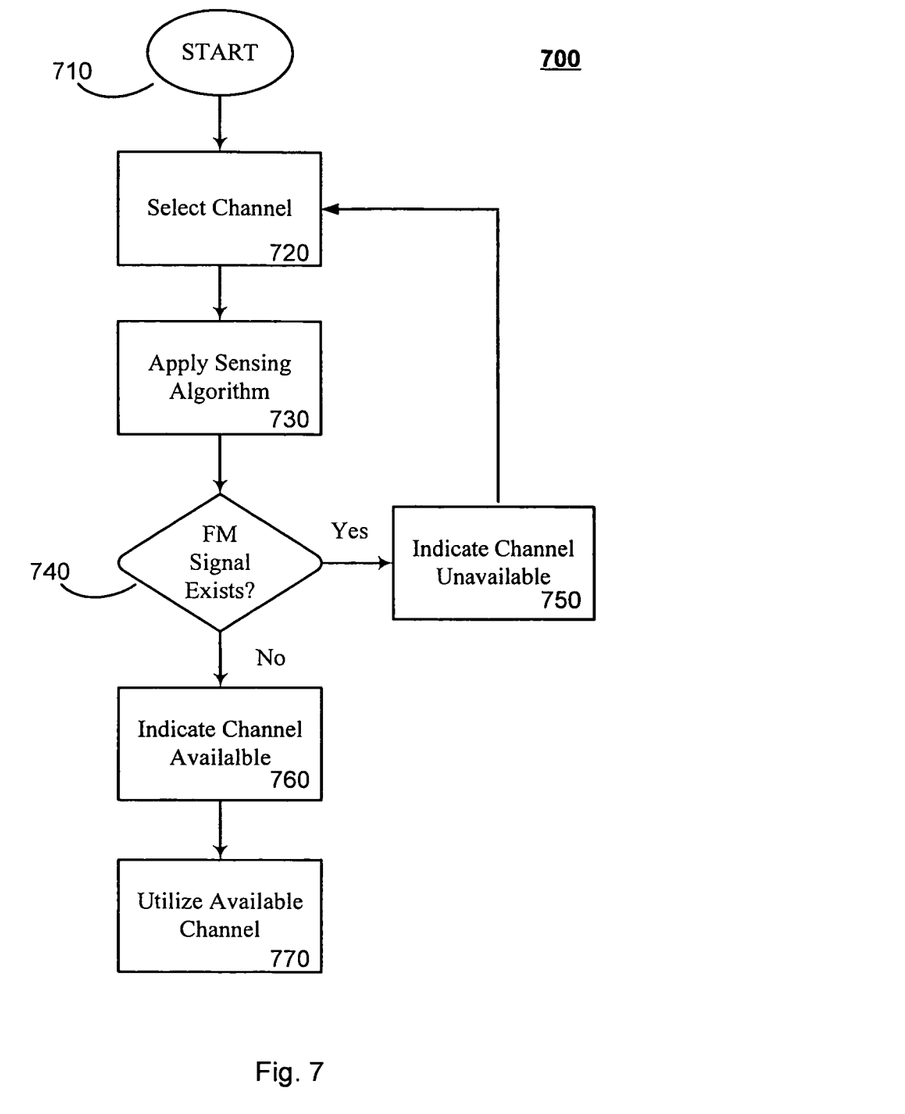
FIG. 7 illustrates one embodiment of a method flow diagram performed by the white space detector according to aspects of the invention.

FIG. 7 depicts an example flow diagram of a method 700 according to aspects of the invention. The method 700 is an example method that can be used to detect an FM transmission using the autocorrelation sensing method and algorithm presented above with respect to FIG. 4. An example method begins at step 710 and a frequency band is selected at step 720 which may be associated with a channel, such as a television or other licensed spectrum channel. The method 700 applies the sensing or detection algorithm or method at step 730 as described hereinabove, for example, as described in steps 420 through 450 of FIG. 4. As a result of the sensing or detection, step 740 inquires whether a an FM signal in the white space channel exists. The FM signal may be generated by a licensed transmitter, such as a wireless microphone. If an FM signal exists in the selected white space channel that was analyzed, then the channel is indicated as being unavailable for user transmission at step 750. This indication can be either an internal indication, such as setting a flag, or the indication can be a display to the user. If the selected channel is unavailable the method 700 can exit or return to step 720 where a next channel in a frequency band is selected, either automatically as in a scan of possible channels, or as a result of a user input or selection. Steps 730 through 740 are then executed again for the next channel.

If, at step 740, it is determined that a white space channel is available, then the channel can be indicated as being available for user transmission in step 760. The user can then utilize the available white space channel for transmission at step 770.

The flow diagram of FIG. 7 may be modified to be used repetitively to scan all of the available channels within a section of spectrum that could possibly be used by an unlicensed device, such as a PDA. For example, a PDA detector, such as described above with regards to FIG. 5, can repeatedly apply a method similar to FIG. 700 to sample and determine if a licensed FM signal exists in any or all of the channels in a spectrum of interest. The results of such a scan may be provided or displayed to a user. Given that all of the available channels are now listed as either occupied by a licensed signal or available for user transmission, the user may automatically or manually select which ones of the available channels to utilize for voice or data transmission using the PDA. Thus, in one aspect of the invention, all or a portion of the available spectrum may be analyzed before a user selects an available white space channel for transmission.

Figure 8:
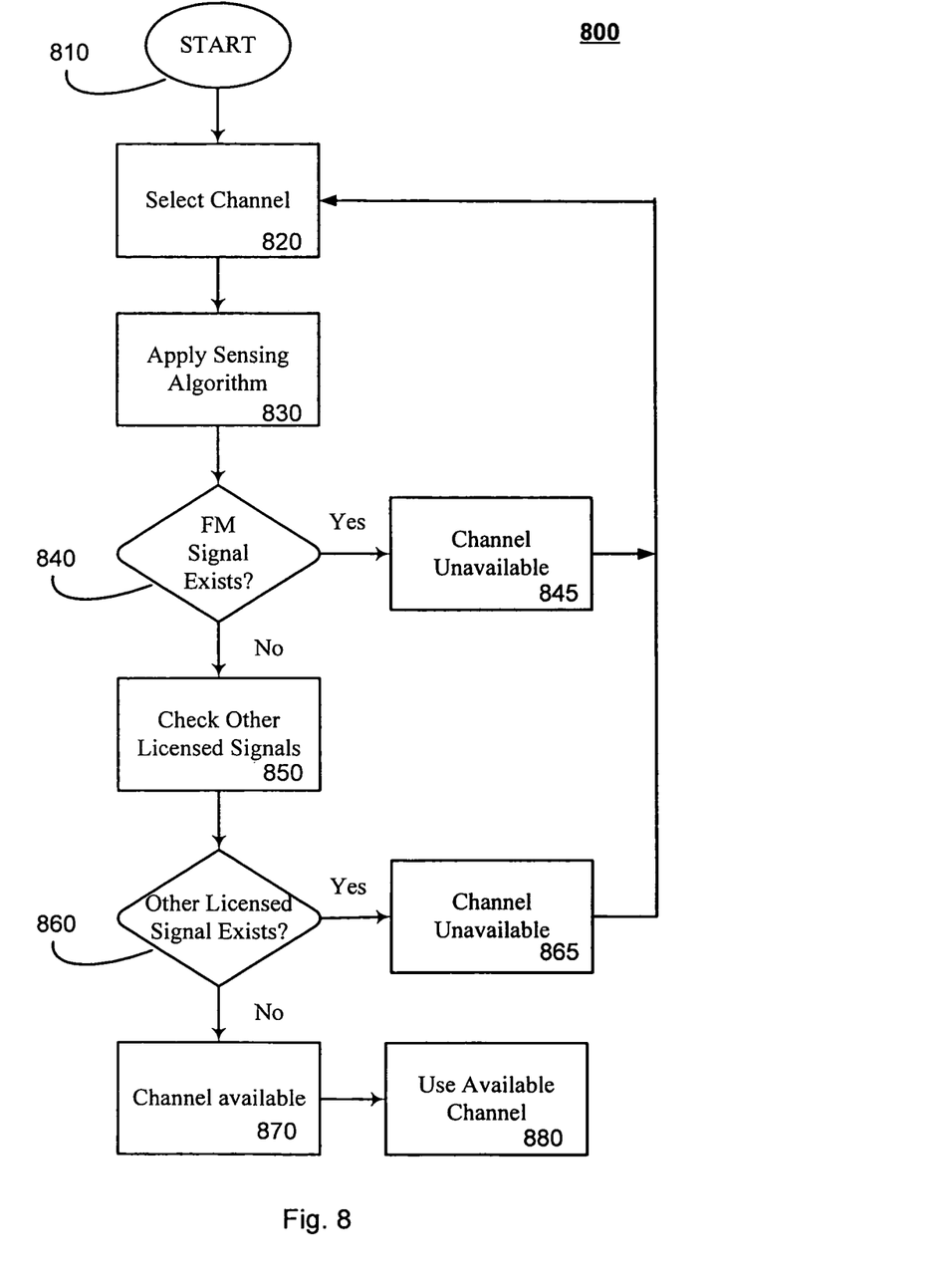
FIG. 8 illustrates another embodiment of a method flow diagram of performed by the white space detector according to aspects of the invention.

FIG. 8 is an example flow diagram of a more comprehensive detection method 800 according to the present invention. The method 800 starts at step 810 and a frequency band is selected at step 820 which may be associated with a channel, such as a television or other licensed spectrum channel. The method 800 applies the sensing or detection algorithm or method at step 830 as described hereinabove, for example, in steps 420 through 450 of FIG. 4. As a result of the sensing or detection, step 840 inquires whether an FM signal in the white space channel exists. The FM signal may be generated by a licensed transmitter, such as a wireless microphone. If an FM signal exists in the selected white space channel that was analyzed, then the channel is indicated as being unavailable for user transmission at step 845. This indication can be either an internal indication, such as setting a flag, or the indication can be a displayed to the user. If the selected channel is unavailable the method 800 can exit or return to step 820 where a next channel in a frequency band is selected, either automatically as in a scan of possible channels, or as a result of a user input or selection. Steps 830 through 840 are then executed again for the next channel.

If, at step 840, it is determined that a white space channel is available because there are no FM signals present in the selected channel, then method 800 at step 850 checks for other licensed signals operating in the selected channel. For example, non-FM signals, such as DTV Advanced Television Systems Committee (ATSC) or analog television National Television System Committee (NTSC) signals may be present in the selected band analyzed above. At step 850, a method for detection of licensed non-FM signals existing in the frequency band or channel of interest is performed. At step 860 an inquiry of whether non-FM signals exist in the band or channel of interest is made.

If non-FM signals exist in the examined band or channel, then the step 865 indicates the band or channel as being unavailable for user transmission. As above, this indication can be either an internal indication, such as setting a flag, or the indication can be displayed to the user. If there are no other licensed signals in the selected band or channel of interest as a result of steps 850 and 860, then the channel of band is indicated as being available at step 870. This indication can be either an internal indication, such as setting a flag, or the indication can be a displayed to the user. Once a channel is determined to be free from licensed users, then the channel may be utilized at step 880 by a user device.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

The invention claimed is:

1. A method performed by a device to detect band availability, the method comprising:
obtaining a digital sample set of a selected frequency band;
calculating an autocorrelation function using the digital sample set, wherein the autocorrelation function is calculated by excluding a set of initial correlation delay values indicating adjacent channel interference from the calculation of the autocorrelation function to reveal a sinusoidal property of a frequency modulation signal;
calculating a decision statistic; and
determining if a frequency modulation signal is operating in the selected frequency band based on the decision statistic.

2. The method of claim 1, further comprising:
providing an indication of the presence or absence of a frequency modulation signal use in the selected frequency band.

3. The method of claim 1, further comprising:
utilizing the selected frequency band if no frequency modulation signal is present in the selected band.

4. The method of claim 1, further comprising:
selecting a next frequency band and performing the steps of claim 1.

5. The method of claim 1, further comprising the step of initially receiving a signal in a selected frequency band from either a user-selection or an automatically generated frequency band.

6. The method of claim 1, wherein the step of obtaining a digital sample of the selected frequency bandwidth comprises performing an analog to digital conversion of the selected frequency band.

7. The method of claim 1, wherein the step of calculating a decision statistic comprises computing a decision statistic that represents a maximum value of statistics calculated using multiple carrier frequency values in the selected frequency band.

8. The method of claim 1, wherein the step of calculating a decision statistic comprises computing a decision statistic based on a single carrier frequency in the selected band.

9. The method of claim 1, wherein the step of determining if a frequency modulation signal is operating in the selected frequency band based on the decision statistic comprises determining if the value of the decision statistic exceeds a threshold.

10. A device to detect frequency modulated signals in a frequency band, the device comprising:
an analog to digital converter to produce a digital sample of a selected band;
a processor having access to memory, wherein the processor calculates an autocorrelation function using the digital sample such that the autocorrelation function is calculated by excluding a set of initial correlation delay values indicating adjacent channel interference from the calculation of the autocorrelation function to reveal a sinusoidal property of frequency modulation signal, wherein the processor calculates a decision statistic using the autocorrelation function, and determines if a frequency modulation signal use is present in the selected frequency band based on the decision statistic.

11. The device of claim 10, further comprising:
a display and user interface accommodating input and outputs functions.

12. The device of claim 10, further comprising an interface to a transceiver for use in the event that no frequency modulation signal is detected in the selected frequency band.

13. The device of claim 10, wherein the device is a mobile device.

14. The device of claim 10, wherein the processor calculates the decision statistic which represents a maximum value of statistics calculated using multiple carrier frequency values in the selected frequency band.

15. The device of claim 10, wherein the processor calculates the decision statistic based on a single carrier frequency in the selected band.

\* \* \* \* \*